United States Patent
Hamano et al.

(10) Patent No.: US 6,259,539 B1
(45) Date of Patent: *Jul. 10, 2001

(54) FACSIMILE DEVICE CAPABLE OF PROPERLY RECORDING HALFTONE IMAGE AND TEXT IMAGE

(75) Inventors: Hiroaki Hamano, Hirakata; Keiji Nakatani, Toyokawa, both of (JP)

(73) Assignee: Minolta Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/796,995

(22) Filed: Feb. 7, 1997

Related U.S. Application Data

(63) Continuation of application No. 08/291,351, filed on Aug. 16, 1994, which is a continuation of application No. 07/711,328, filed on Jun. 6, 1991, now abandoned.

(30) Foreign Application Priority Data

| Jun. 11, 1990 | (JP) | 2-153616 |
| Jun. 11, 1990 | (JP) | 2-153617 |

(51) Int. Cl.⁷ ............................................. H04N 1/40
(52) U.S. Cl. ......................... 358/462; 358/456; 358/459
(58) Field of Search ................................. 358/462, 443, 358/447, 448, 455, 456, 457, 458, 459

(56) References Cited

U.S. PATENT DOCUMENTS

| 2,255,408 | * | 9/1941 | Carlisle | 358/462 |
| 3,806,641 | * | 4/1974 | Crooks | 358/459 |
| 4,680,645 | * | 7/1987 | Dispoto et al. | 358/459 |
| 4,786,976 | | 11/1988 | Takao et al. | 358/456 |
| 4,903,143 | * | 2/1990 | Sakamoto | 358/462 |
| 4,975,785 | * | 12/1990 | Kantor | 358/477 |
| 5,128,699 | * | 7/1992 | Nakajima et al. | 358/459 |
| 5,157,507 | * | 10/1992 | Yamada | 358/462 |

FOREIGN PATENT DOCUMENTS

| 54-023535 | 2/1979 | (JP) . |
| 56-153332 | 11/1981 | (JP) . |
| 60-194472 | 10/1985 | (JP) . |
| 60-242766 | 12/1985 | (JP) . |
| 61-020471 | 1/1986 | (JP) . |
| 62-091078 | 4/1987 | (JP) . |
| 62-216475 | 9/1987 | (JP) . |
| 63-11832 | 3/1988 | (JP) . |
| 63-58427 | 11/1988 | (JP) . |
| 63-305671 | 12/1988 | (JP) . |
| 1-258555 | 10/1989 | (JP) . |
| 63-305671 | 12/1998 | (JP) . |
| 61-004874 | 1/2000 | (JP) . |

* cited by examiner

*Primary Examiner*—Thomas D. Lee
(74) *Attorney, Agent, or Firm*—Sidley & Austin

(57) ABSTRACT

A facsimile device having a copy mode includes an image reader and a recording device and forms an image with the recording device based on a received signal from a communication network or a read signal from the image reader. In the copy mode, data processing of the read image is performed in accordance with the resolution and half tone expression characteristic of the image reader and the recording device. In a facsimile mode, data processing of the image is performed with a reproduction characteristic according to the half tone and text images.

15 Claims, 18 Drawing Sheets

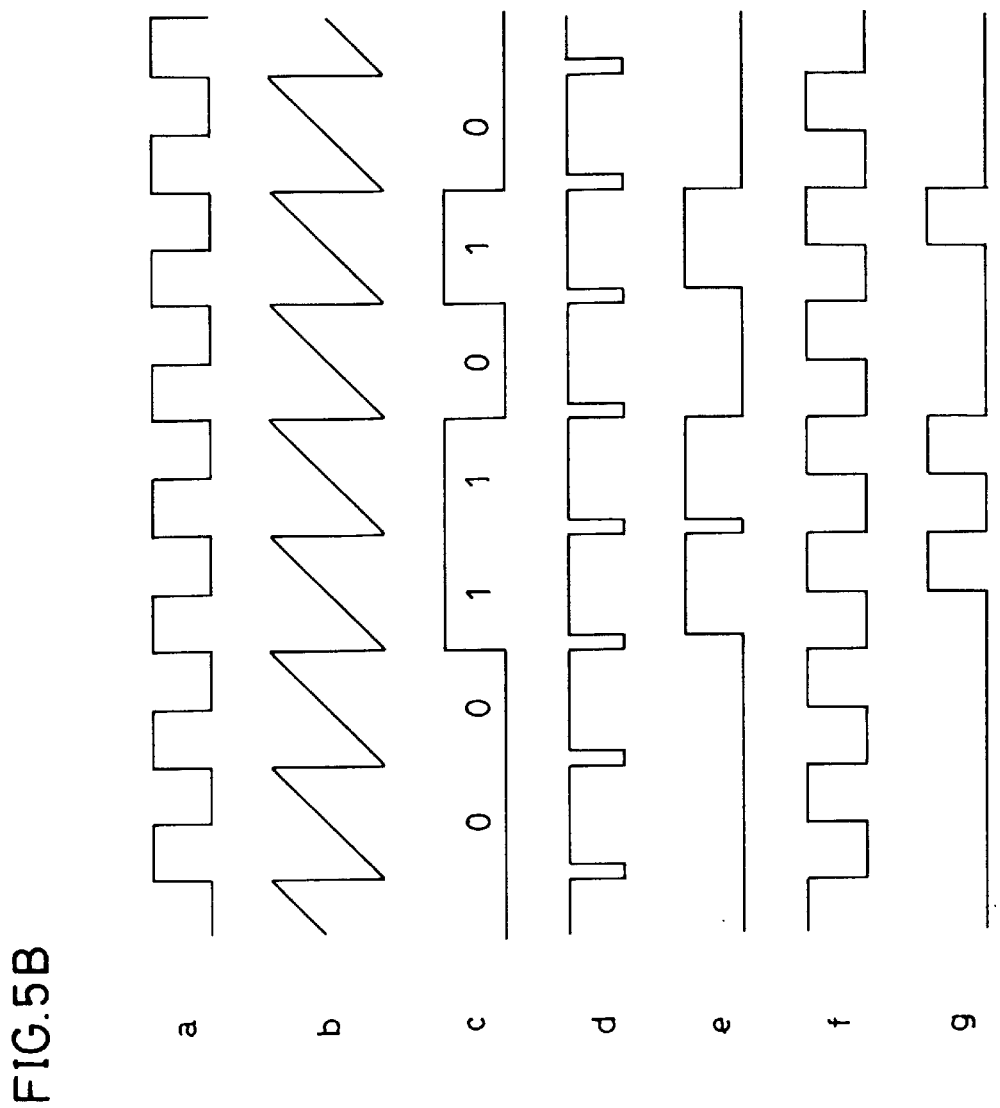

| FIRST SIGNAL | SECOND SIGNAL | DOT SIZE DETERMINING SIGNAL | DETERMINATION |
|---|---|---|---|
| 0 | 0 | 1 | HALF TONE IMAGE |
| 0 | 1 | 1 | HALF TONE IMAGE |
| 1 | 0 | 1 | HALF TONE IMAGE |
| 1 | 1 | 0 | TEXT IMAGE |

FIG.17
(1)
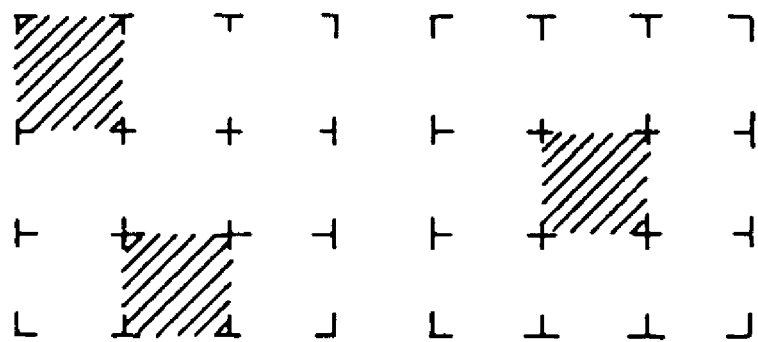
(2)
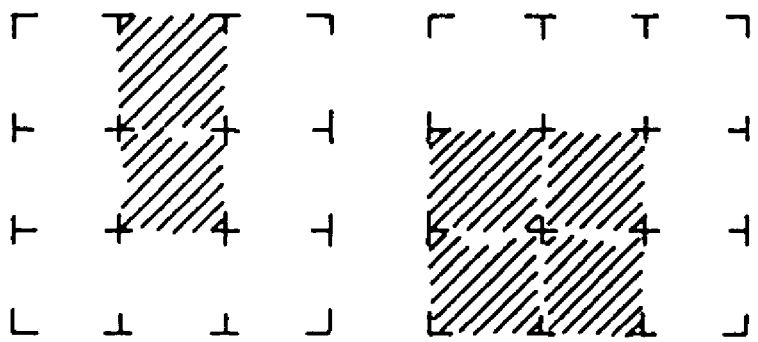

FACSIMILE DEVICE CAPABLE OF PROPERLY RECORDING HALFTONE IMAGE AND TEXT IMAGE

This application is a continuation, of application Ser. No. 08/291,351, filed Aug. 16, 1994, which is a continuation of 07/711,328, filed Jun. 6, 1991 now abandoned.

BACKGROUND OF THE INVENTION

1. Field of the Invention

The invention relates generally to facsimile devices and, more particularly, relates to facsimile devices having a copy mode in which an image read in a read portion is image-formed and outputted in a storing portion of the same device.

2. Description of the Related Art

A facsimile device having a conventional copy mode operates as a digital copying apparatus when a copy mode is set.

In the facsimile device having a copy mode, when the device is set to the copy mode, data processing of an image read is carried out in accordance with the resolution and half tone expression characteristic of a reader and a recorder, and image-forming is performed with an appropriate dot size.

In a facsimile mode, there is a problem that while the image is outputted based on data transmitted, with resolution and gradation determined according to a standard, the transmitted image data has no relation with the performance and the density characteristic of a receiving recorder, so that when image-forming is performed with the same dot size as in the copy mode, the image read at the transmitting source cannot be reproduced faithfully. For example, the density of the half tone image is reproduced higher than an appropriate density, is or a line image in a text image mainly including characters becomes thin or broken and difficult to read.

SUMMARY OF THE INVENTION

Therefore, an object of the present invention is to properly reproduce a half tone image and a text image in a facsimile device.

Another object of the present invention is to properly reproduce a halftone image and a text image in a simple way in a facsimile device.

Still another object of the invention is to faithfully reproduce a received image, as read at a transmitting source, in a facsimile device having a copy mode.

Yet another object of the invention is to faithfully reproduce a received image, as read at a transmitting source with a simplified structure in a facsimile device having a copy mode.

The above-mentioned objects of the present invention can be achieved by a facsimile device including elements below. That is, a facsimile device according to the present invention includes a receiver for receiving an image through a communication line, an image forming device for forming an image with a plurality of unit pixels based on image data, a determining device for determining whether the image data is image data of a character image or image data of a half tone image, and a controller for controlling a condition for forming the image of the image forming device based on the result of the determination of the determining device.

Since the facsimile device includes the elements above, the condition for forming the image of the image forming means is controlled according to the kind of the received image at the time of receiving. As a result, in the facsimile device, both a half tone image and a text image can be reproduced properly.

In another aspect of the present invention, a facsimile device includes a receiver for receiving image data through a communication line, a reader for reading an original image and creating image data, an image forming device for forming an image with a plurality of unit pixels based on the image data from the receiver or the reader, a determining device for determining whether the image used for forming the image of the image forming device is image data from the receiver or image data from the reader, and a controller for controlling a condition for forming the image of the image forming device based on the result of determination of the determining device.

The facsimile includes the elements above, so that the condition for forming the image in the image forming device is changed depending on whether it is image-forming based on a received signal or a read signal. As a result, the received image read at the transmitting office can be faithfully reproduced in the facsimile device having the copy mode.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 5A and 5B are a block diagram and a timing chart of a dot size switching circuit according to a first embodiment of the present invention.

FIGS. 14 to 17 are diagrams showing cases in which determination of an image is made on a page basis and on a pixel basis.

DESCRIPTION OF THE PREFERRED EMBODIMENTS

A description will be made below of embodiments according to the present invention with reference to the appended drawings.

Figure 1:
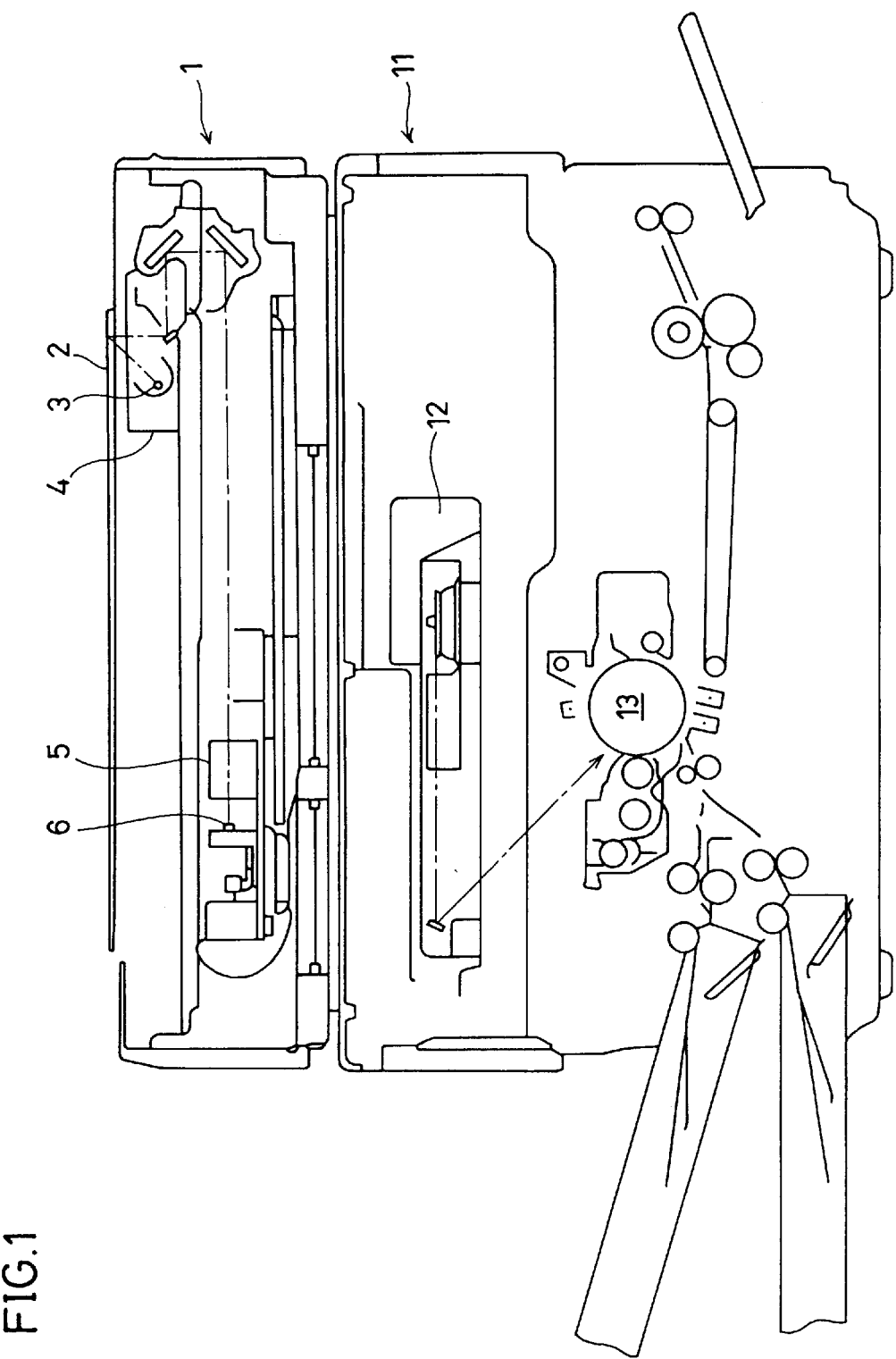
FIG. 1 is a schematic cross-sectional view showing an outline of a laser facsimile device.

FIG. 1 is a schematic cross-sectional view showing an outline of a laser facsimile device capable of a copy operation and having an original reading portion 1 for reading an image original and a printing portion 11 for receiving image data representative of an image original.

In the original reading portion 1, a movable scanner 4 scans an original while irradiating the original on a platen 2 with a light source 3. The light reflected from the original is reflected by a mirror and enters a linear CCD sensor (for example 8 pixels/mm) 6 through a lens 5. The output signal of the linear CCD sensor 6 is digitized and then binarized as will be described later. In the original reading portion 1 stated above, in place of the movable scanner 4 for scanning the original, a mount for receiving an original, capable of moving with the original mounted thereon, may be employed for scanning.

In the printing portion 11, the emission of the laser diode is controlled in accordance with an image signal received at a laser optical system 12. The laser is directed to a photoreceptor 13. Then, development, transfer, and fixing is carried out by a well known electrophotographic process, and the received signal is printed on plain paper.

Since the reading and printing operation above is the same as in a conventional laser printer, a detailed description thereof will not be repeated here.

An outline of the operation of the facsimile device will now be described, referring to FIG. 2. Firstly, a description will be made of the operation at the time of transmission. A photoelectric converting portion 31, including the linear CCD sensor 6 of the reading portion 1, converts the original into an electric signal. Then, a predetermined binarizing process (dither process or the like) is applied to the converted electric signal by a processing portion 32, thus converting the electric signal into a binarized time sequence signal. Subsequently, the time sequence signal is encoded by a compressing portion 33 in a mode of MH, MR, or the like. Then, the encoded signal is stored in an encode memory 34. The facsimile device is connected to a receiving device (not shown) by a transmission controlling portion 35. The signal, as stored in the memory 34, is transmitted to a network through a network connecting portion 36 with a predetermined procedure.

The operation of receiving image data from a transmitting source will now be described. When the transmission controlling portion 35 receives a connection request from a transmitting source through the network connecting portion 36, the facsimile device is connected to the transmitting source to receive an image signal. When received, the signal is stored in the encode memory 34. An expanding portion 37 decodes the image signal stored in encode memory 34, and the decoded signal is converted into a signal which can be supplied to a recording portion 38. Between expansion and recording, however, the converted signal is temporarily stored in a page memory 40. In an image mode detecting portion 41, a determination is made as to whether the decoded, or expanded, image signal represents a text image or a half tone image with reference to expanded image strings of white and black. The details thereof will be described later. The image data stored in the page memory 40 is supplied to the recording portion 38. The recording portion 38 forms an image on a piece of paper based on the supported image data.

A description will now be made of a copy operation, referring to FIGS. 1 and 2. The original is converted into an electric signal by the photoelectric converting portion 31, including the linear CCD sensor 6 of reading portion 1. And then, a predetermined binarizing process (dither process or the like) is applied to the electrical signal by the processing portion 32, thus converting the electrical signal into a binarized time sequence signal for recording in recording portion 38.

The operation at the time of an administration report output mode will now be described. When an administration report key 56 for forming an administration report (as will be described later in reference to FIG. 3) is pressed, the image data recorded, whether through transmission of or receiving a facsimile, are represented by a character font stored in a ROM built in the facsimile device. It is transferred to the page memory 40 and supplied via the recording portion 38 as an administration report.

A controlling portion 39 processes the signals above according to the instruction of an operation display portion 51.

Figure 3:
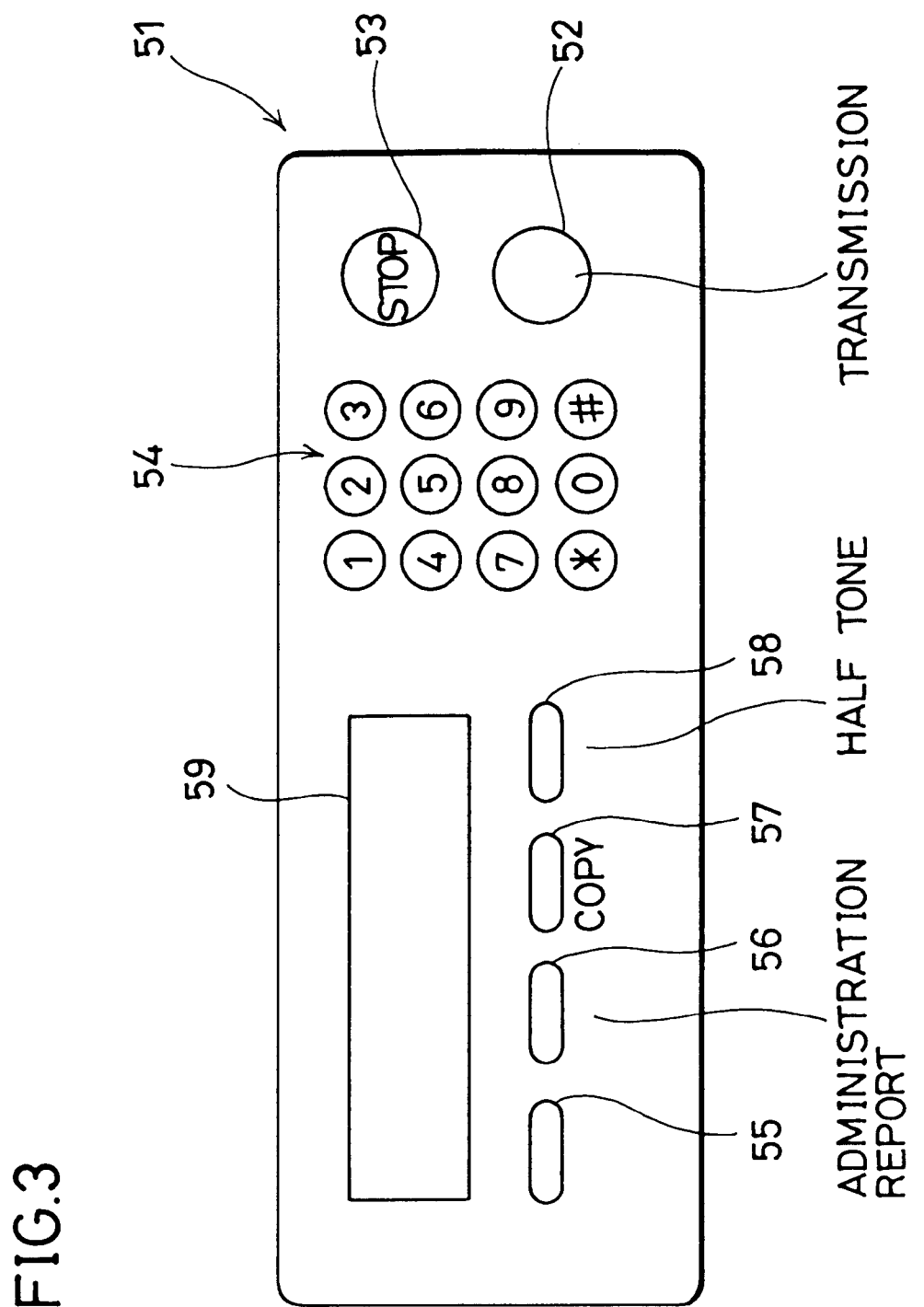
FIG. 3 is a plan view of an operation display portion.

FIG. 3 is a plan view indicating the operation display portion 51. A transmission key 52 is a key for starting transmission. A STOP key 53 is a key for stopping transmission. Keys (e.g., "1", "2" . . . , "9", "0", "*", "#") 54 are used for setting, clearing, and registering telephone numbers.

A half tone key 58 is a key for reading and binarizing an image at the time of copying or transmitting, or for conducting a half tone process (dither process). A copy key 57 is a key for starting a copy operation. An administration report key 56 is a key for starting the provision of certain data, for example, the time, the telephone number, the number of pages at the time of transmission, to assimilate into a list.

Figure 4:
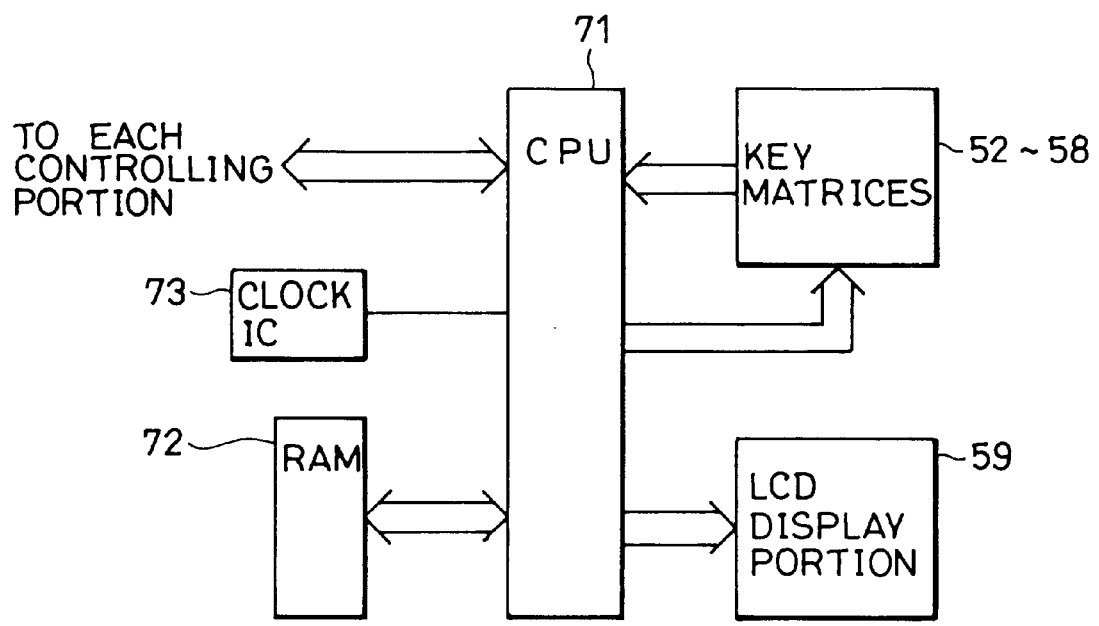
FIG. 4 is a circuit diagram of a CPU for controlling the facsimile device.

FIG. 4 is a circuit diagram showing a state in which a CPU 71 for controlling the facsimile device is connected to other devices. The CPU 71 is connected to a RAM 72 for working and a clock IC 73.

Figure 2:
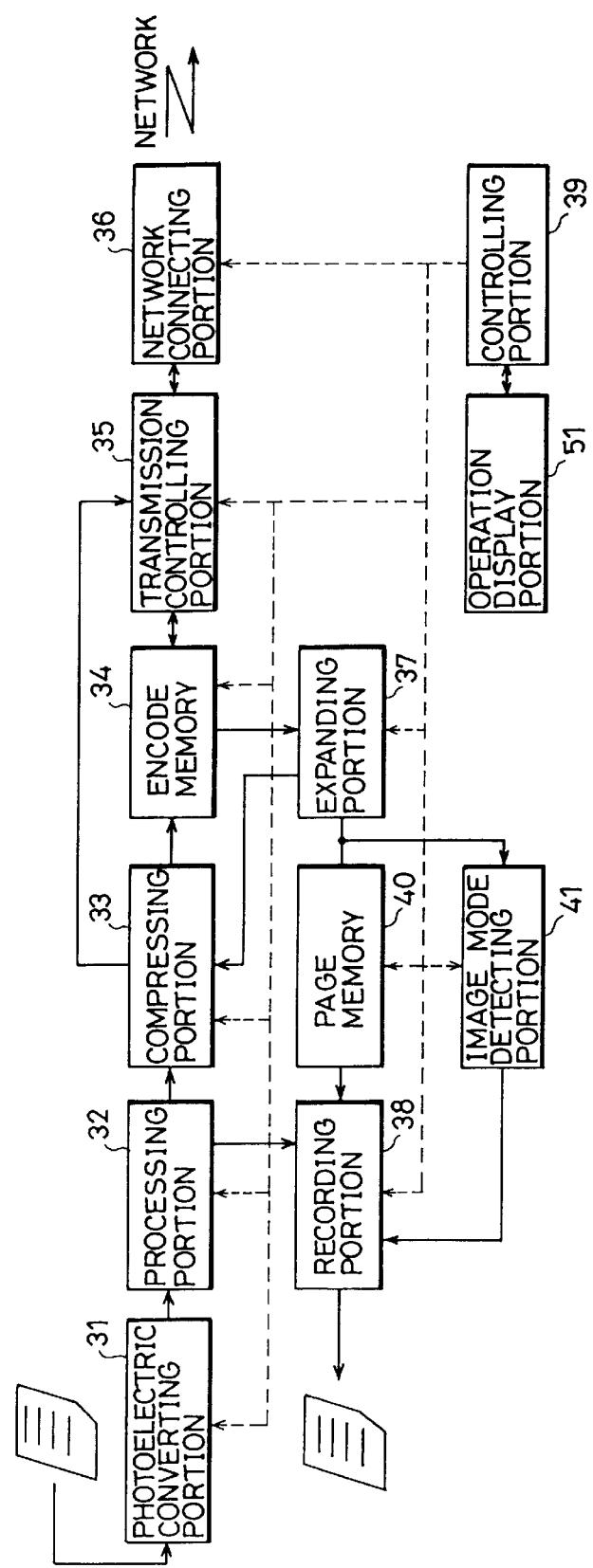
FIG. 2 is a block diagram showing an outline of the operation of the facsimile.

The CPU 71 is also connected to key matrices 52 to 58 of the operation display portion 51, an LCD display portion 59 and each controlling portion (see FIG. 2).

I. First Embodiment A description will now be made of the operation of a facsimile device in a first embodiment according to the present invention with reference to FIGS. 5A and 5B. In the first embodiment according to the present invention, a dot size of dots forming an image is switched between a mode for receiving facsimile image data and a copy mode.

The facsimile device is configured such that at the time of receiving, transmitted image data a determination is automatically made as to whether the image is a half tone image or a text image based on the received data. If the received data represents a half tone image, a dot size is set rather small to make it possible to faithfully reproduce the density of the image. If the received data represents a text image, a dot size is set rather large so that the characters and so on can be clearly reproduced without a line image being too thin or broken.

In the copy mode, when the operator makes a determination to operate the keys on the operator panel 51, the dot size can be switched and the density of the image can be freely set.

Figure 5A:
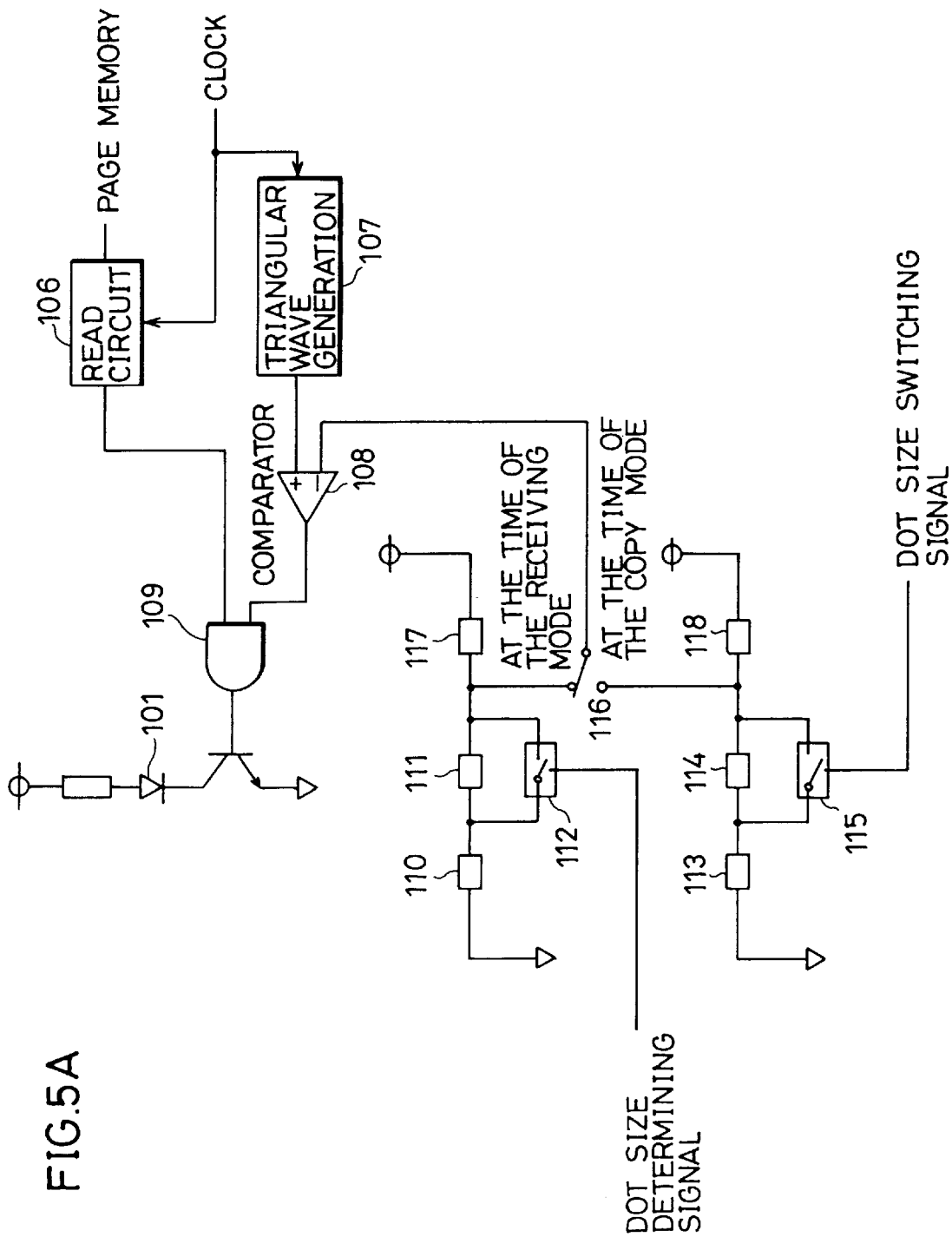

FIG. 5A is a block diagram of a switching circuit for switching the dot size according to a mode and the kind of image. FIG. 5B is a timing chart of the circuit shown in FIG. 5A.

As shown in FIG. 5A, a comparison voltage supplied to a comparator 108 for changing the dot size is switched by a switch 116. The switch 116 is switched according to a switching signal supplied from the CPU 71 depending on whether the facsimile device is in a receiving mode or a copy mode. Furthermore, the value of the voltage applied to the switch 116 is set according to a combination of resistance values of resistors 110, 111, 117 when the facsimile device is in the receiving mode, and is set according to a combination of resistance values of resistors 113, 114, 118 when the facsimile device is in the copy mode. That is, when the facsimile device is in the receiving mode, a switch 112 is switched according to a dot size determining signal from the image mode detecting portion 41. In contrast, when the facsimile device is in the copy mode, a switch 115 is switched by a dot size switching signal from the CPU 71 and the combination of the above-mentioned resistors is changed. Each resistor has a respective predetermined resistance value. Setting of the comparison voltage differs between the time for the copy mode and the time for the receiving mode.

In FIG. 5B, the waveform a indicates a clock timing signal. Printing data is read from the page memory 40 and a triangular wave is generated from a triangular wave generating circuit 107 for controlling the dot size in synchronous with the clock. The waveform b is a waveform of a triangular wave generated in synchronization with the clock. The waveform c is a waveform of printing data read in synchronization with the clock. When the value of the waveform c is 1, it corresponds to black, and when it is 0, it corresponds to white.

The waveforms d, f are pulse waveforms indicating a dot size. When the copy mode is set through the switch 116 by the signal from the CPU 71, and the switch 115 is turned off with the dot size switching signal being "1", the output waveform of the comparator 108 becomes the waveform d. When the switch 116 is set to the receiving mode and the switch 112 is turned off with the dot size determining signal being "1", the comparison voltage supplied to the comparator 118 goes high and the output waveform of the comparator 108 becomes the waveform f. When the waveform c and the waveform d are input to AND gate 109, the waveform e is output therefrom. When the waveform c and the waveform f are input to AND gate 109, the output waveform of the AND gate 109 is waveform g. As a result, the time period during which the power is supplied to a semiconductor laser 101 is thus controlled and the dot size is controlled.

Though the dot size is set larger for the copy mode than for the receiving mode in this embodiment, it may be set in a reverse way according to the characteristics of the facsimile device, such as resolution.

In the copy mode, the dot size switching signal is a signal supplied from the CPU 71 according to the instruction of the operator. When this signal is "0", the switch 115 is turned on, the comparison voltage is reduced, and furthermore the dot size is set large. When the dot size becomes larger, the image density becomes higher as a whole. While the reproducibility of half tones is reduced, a text image may be clearly reproduced and is easy to read.

In the receiving mode, when the dot size determining signal from the image mode detecting portion 41 is "0", the switch 112 is turned on and the dot size is set larger compared with the case in which the dot size determining signal is "1". When the image mode detecting portion 41 determines that the image expanded by the expanding portion 37 is a text image, it supplies "0" as a dot size determining signal, and when it determines that the expanded image is a half tone image, it supplies "1".

Figure 6:
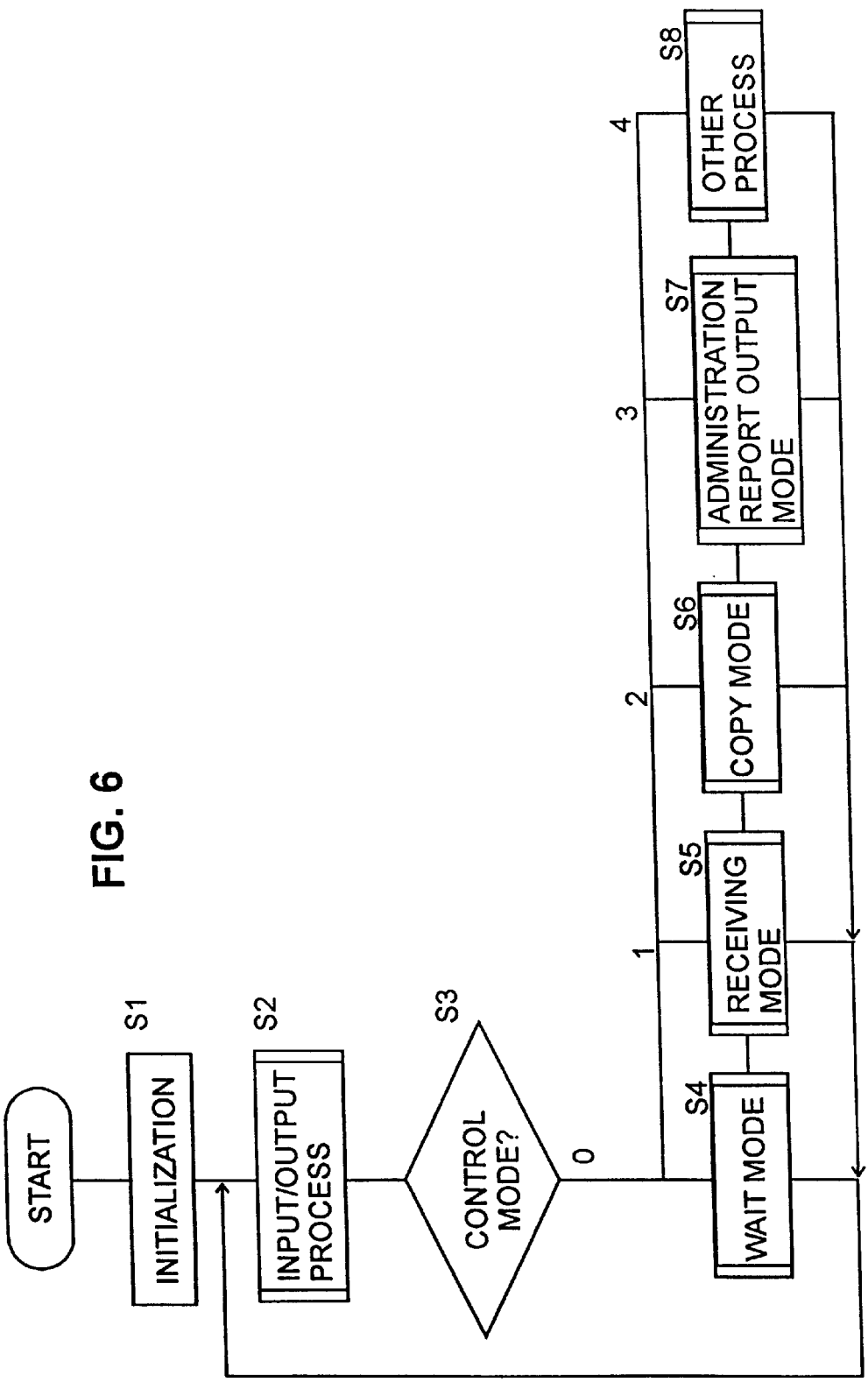
FIG. 6 is a main flow chart of the CPU for controlling the facsimile.

FIG. 6 is a flow chart showing a main flow of the CPU 71 for controlling the facsimile. In the step S1, initialization is performed after resetting the CPU 71. An input/output process of the CPU 71 is carried out in the step S2. Particularly, a determination is made as to whether a half tone process should be conducted or not. In the step S3, the control mode indicating the state of control is checked and the program branches according to the value. If the control mode value is 0, CPU 71 proceeds to the step S4; if the control mode value is 1, CPU 71 proceeds to the step S5; and if the control mode is 2, CPU 71 proceeds to the step S6. In the wait mode of the step S4, an operation of a key or a received signal is awaited. When the device is performing a process of receiving, the program proceeds to the receiving mode of the step S5. When the facsimile device is in the copy mode, it proceeds to the step S6 and copying is performed. When the facsimile device is in the administration report output mode, the program proceeds to the step S7 and an administration report is output. For processes other than those specified above, fore example transmission mode or registering, wherein dialing is effected by touching a button, the program proceeds to other processes in the step S8. After each process is ended, the program returns to the step S2.

Figure 7:
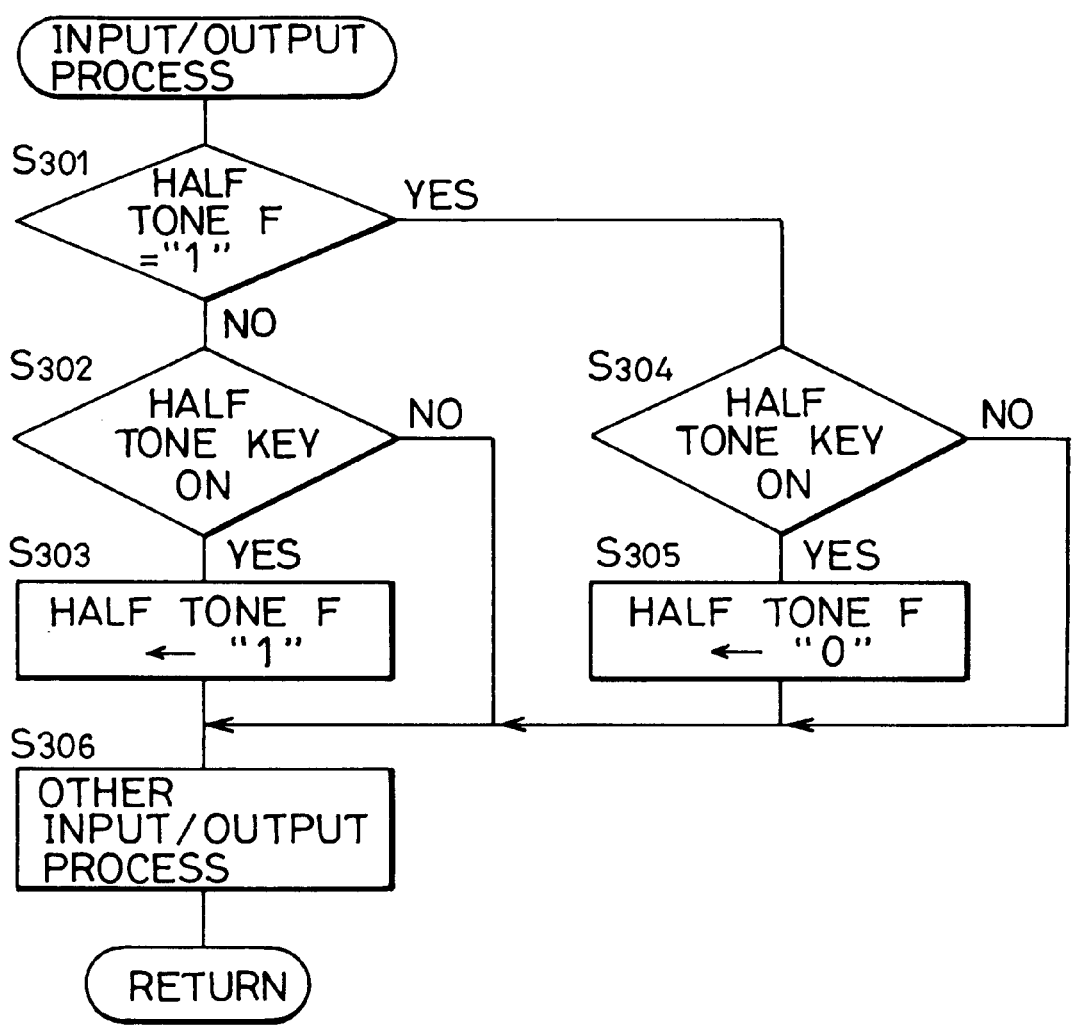
FIG. 7 is a flow chart showing an input/output process.

FIG. 7 is a flow chart showing a flow of the input/output process (step S2). In the step S301, a half tone flag is checked. The flag is "0" in initialization and selects execution of a half tone process which will be described later. If the half tone flag is "0", the program proceeds to the step S302, and if the half tone flag is "1", the program proceeds to the step S304 to accept the change of select or non-select of the halftone process. In the step S302, an ON edge (the change from the OFF state to the ON state) of the half tone key 58 is checked. If the ON edge is detected, the program proceeds to the step S303, sets the half tone flag to "1" and proceeds to the step S306. If there is no ON edge detected, the program goes on to the step S306. In the step S304, an ON edge of the half tone key 58 is checked. If an ON edge is detected, the program proceeds to the step S305, sets the half tone flag to "0" and proceeds to the step S306. If there is no ON edge detected, it goes on to the step S306. In the step S306, an input process of other keys or sensors and an output process to a load are performed.

Figure 8:
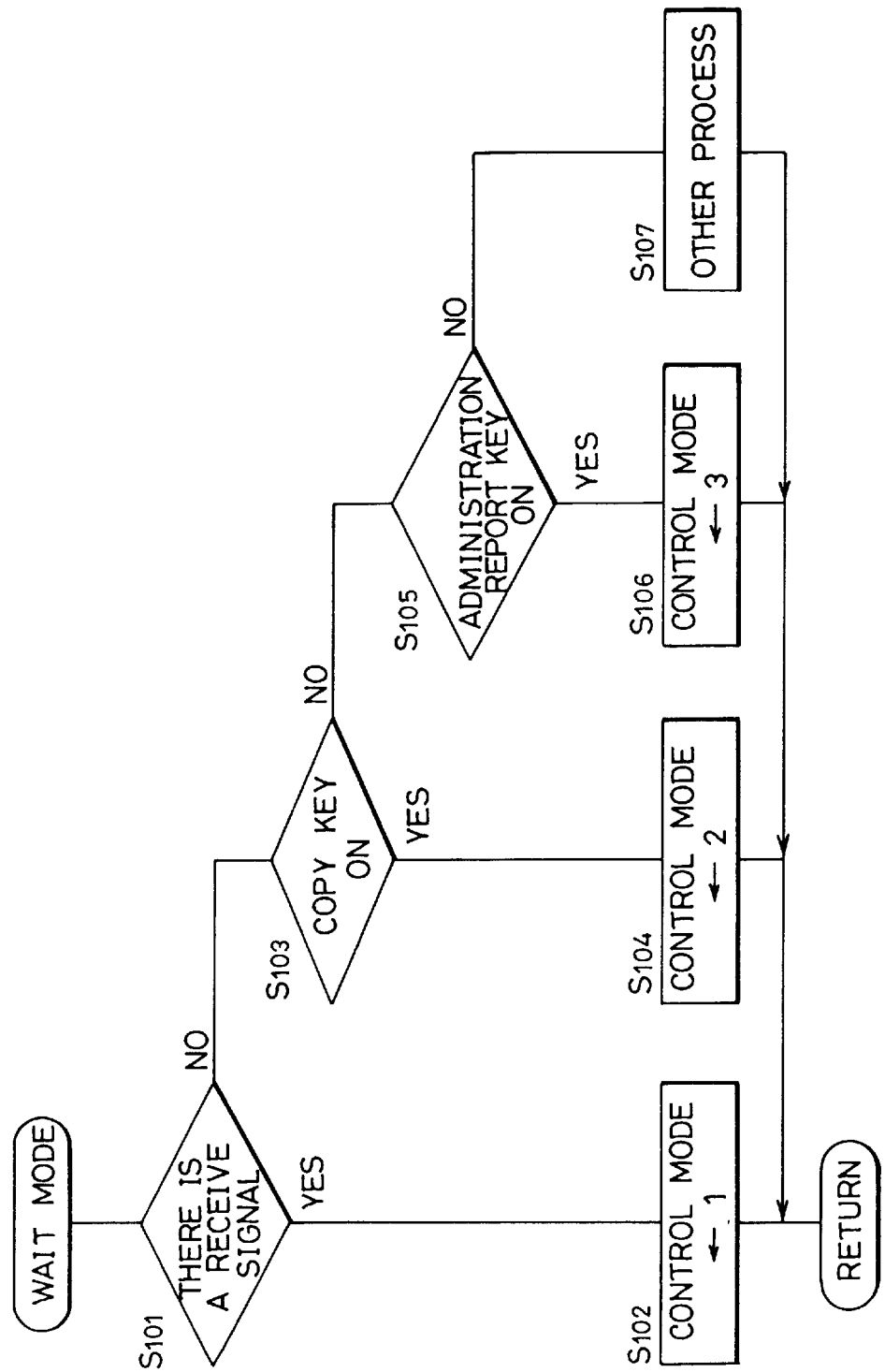
FIG. 8 is a flow chart showing a wait mode.

FIG. 8 is a flow chart showing a flow of a process of the wait mode (step S4). In the steps S101, S103, S105, input of a received signal, the copy mode key 57, and the administration report key 56 are checked, respectively. When a received signal is inputted, the program proceeds to the step S102, sets the control mode to 1, and returns. When the administration report key 56 is pressed, the program proceeds to the step S106, sets the control mode to 3, and returns. When the copy key 57 is pressed, the program proceeds to the step S104, sets the control mode to 2, and returns. When neither of the keys 56, 57 is pressed, and furthermore there is no received signal, the program proceeds to the step S107, carries out other processes, and returns.

Figure 9:
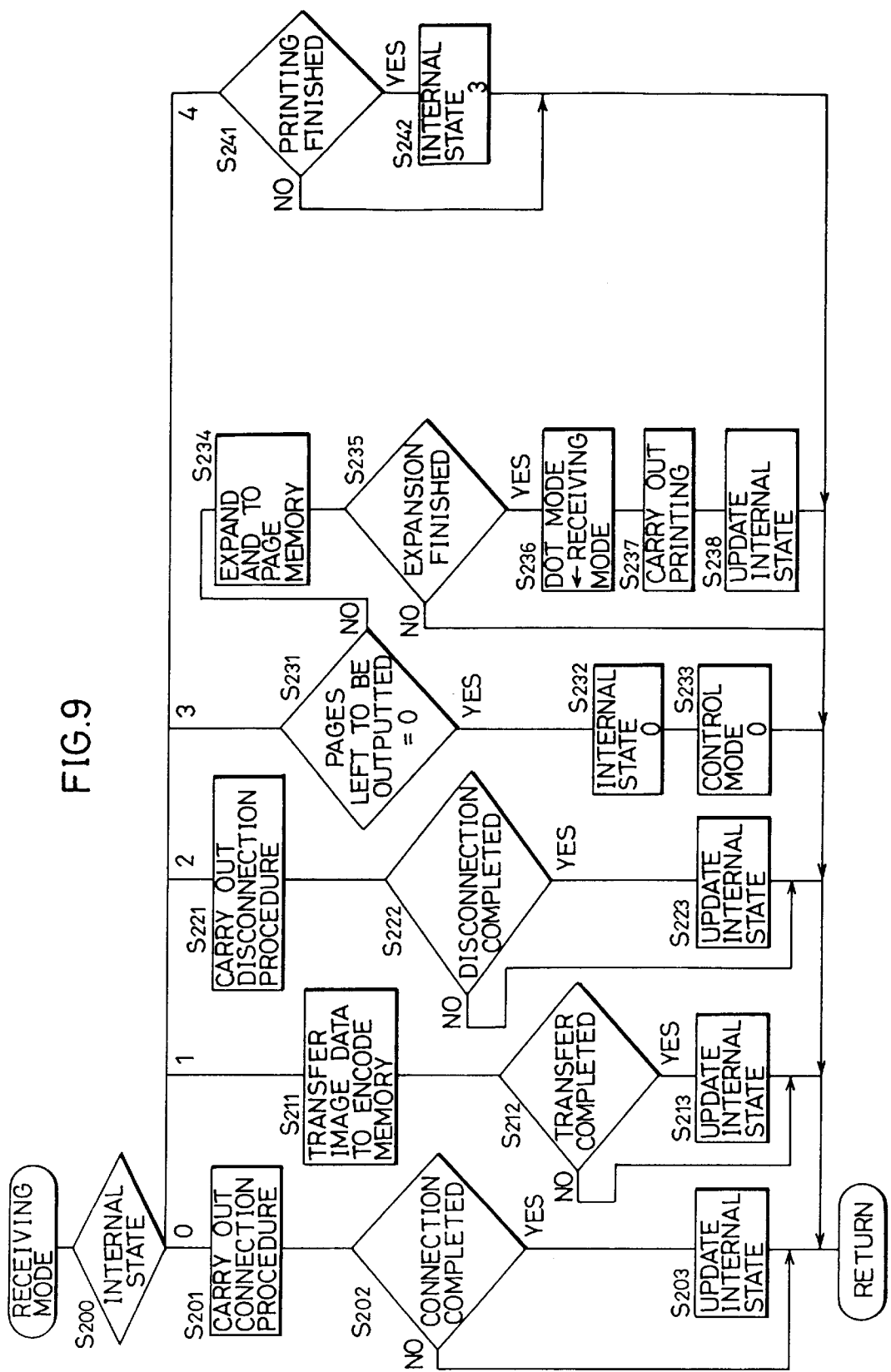
FIG. 9 is a flow chart showing a receiving mode.

FIG. 9 is a flow chart showing the operation of the receiving mode. In the step S200, the value of the internal state at the time of entering the receiving mode is decided, and the flow chart branches to any of the steps S201, S211, S221, S231, and S241 according to the determined internal state. When the internal state is 0, the program proceeds to the step S201, and a connection procedure of the facsimile device is executed. In the step S202, a determination is made as to whether connection is completed or not. If not completed, the program returns at once, otherwise, the program updates the internal state in the step S203 and then returns.

When the internal state is 1, the program proceeds to the step S211 and transfers the transmitted image data to the encode memory 34. In the step S212, a determination is made as to whether the transfer is completed or not. If completed, the program returns at once otherwise, the program updates the internal state in the step S213 and then returns.

When the internal state is 2, the program proceeds to the step S221 to carry out a disconnection procedure. In the step S222, a determination is made as to whether the disconnection is completed or not. If incomplete, the program returns at once, otherwise, the program updates the internal state in the step S223 and then returns.

When the internal state is 3, the program proceeds to the step S231 to determine the number of pages left to be outputted. If the number of pages left is 0, the program sets the internal state to 0 and sets the control mode to 0 in the steps S232, S233, respectively, and returns to the wait mode S4. If the number of pages left is not 0 in the step S231, the program proceeds to S234, S235 to expand the contents of the encode memory 34 and transfer the same to the page memory 40, respectively. Here, the image is expanded line after line, and the details thereof will be described later. Then, a determination is made as to whether the expansion is finished or not in the step S235. If finished, the program sets the switch 116 to the receiving mode in the step S236, executes printing in the step S237, and updates the internal state S238. If expansion is not finished in the step S235, the program returns at once.

When the internal state is 4, the program proceeds to the step S241 to determine whether printing is finished. If unfinished, it returns at once, otherwises, the program sets the internal state to 3 in the step S242 and then returns.

Figure 10:
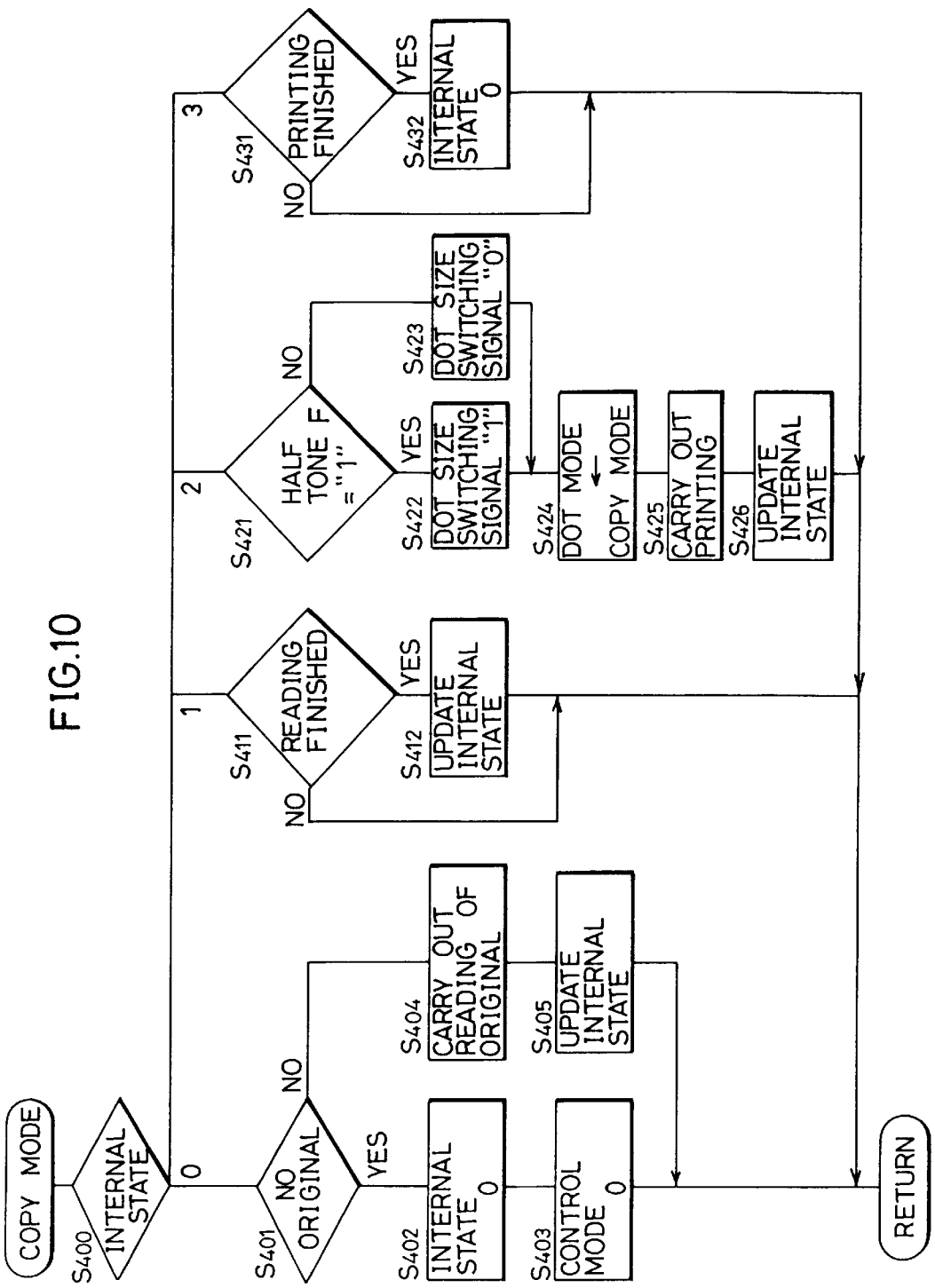
FIG. 10 is a flow chart showing a copy mode.

FIG. 10 is a flow chart showing the operation of the copy mode. In the step S400, the value of the internal state of the copy mode is decided and the program branches to any of the steps S401, S411, S421, S431 according to the value. When the internal state is 0, a decision is made as to whether there is an original or not at step S401. If there is no original, the program proceeds to the steps S402, S403 and sets the internal state and the control mode to 0 and then returns. If there is an original, a determination is made as to whether the half tone mode is set or not in the step S404. If the half tone mode is set, a half tone process such as a dither process is carried out and reading is effected. If the half tone mode is not set, the program carries out reading of the original by simple binarization. The program updates the internal state in the step S405 and then returns.

When the internal state is 1, the program proceeds to the step S411, and a determination is made as to whether reading is finished or not. If unfinished, the program returns at once, otherwise, the program updates the internal state in the step S412 and then returns.

When the internal state is 2, the program proceeds to the step S421, and a determination is made as to whether the half tone flag is "1" or "0". If the half tone flag is "1", the program sets the dot size switching signal to "1" in the step S422. Alternatively, if the half tone flag is "0", the program sets the dot size switching signal to "0" in the step S423. Then, the program switches the switch 116 shown in FIG. 5A to the copy mode in the step S424, carries out printing S425, and updates the internal state in the step S426 prior to returning.

When the internal state is 3, a determination is made as to whether printing is finished or not. If unfinished, the program returns at once, otherwise, the program sets the internal state to 0 in the step S432 and then returns.

Figure 11:
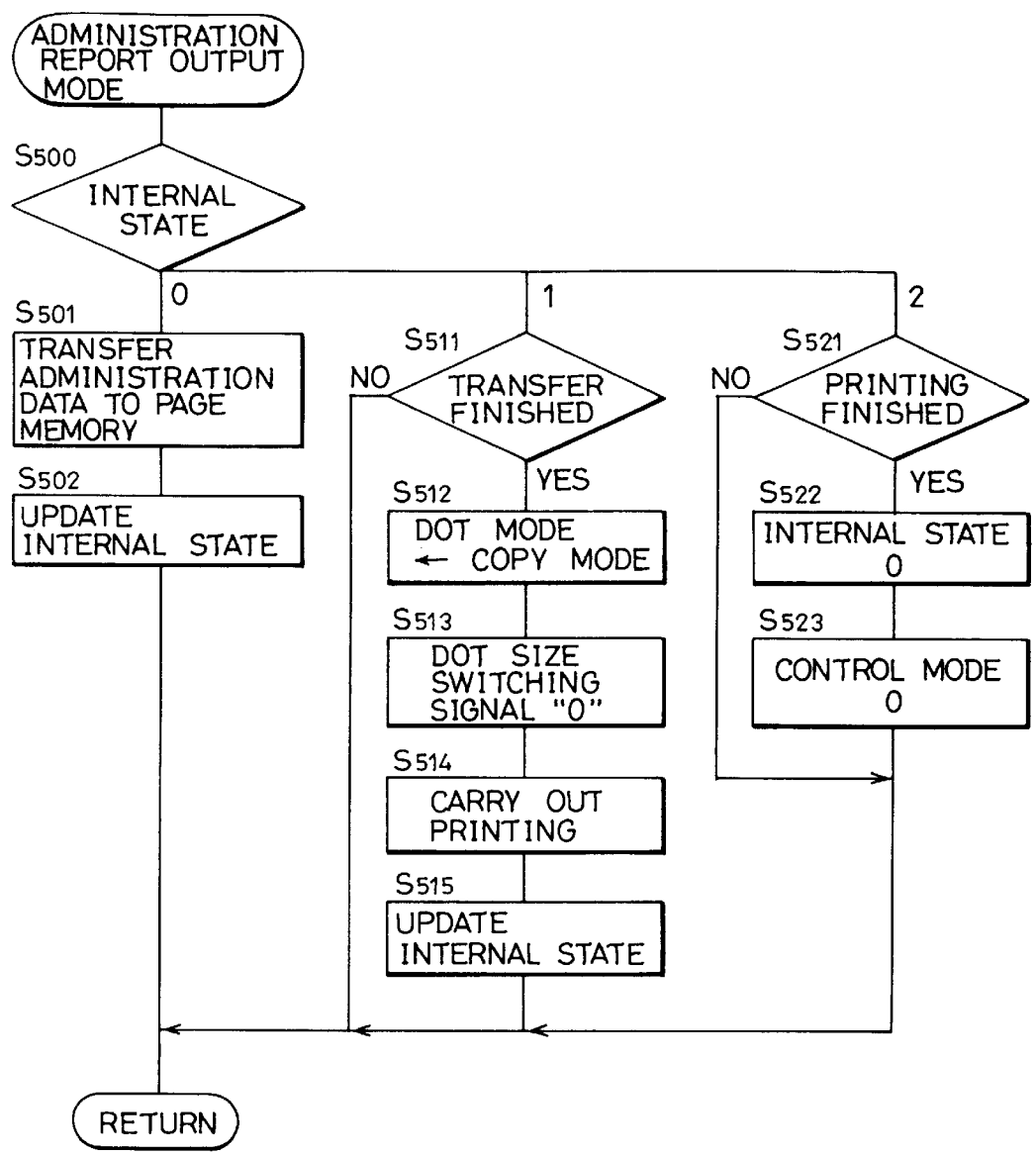
FIG. 11 is a flow chart showing an administration report output mode.

FIG. 11 is a flow chart showing the operation of the administration report output mode. In the step S500, the value of the internal state of the administration report output mode is decided and the program branches to any of the steps S501, S511, S521 according to the value.

When the internal state is "0", the administration data is transferred to the page memory 40 in the step S501, and the internal state is updated in the step S502.

When the internal state is "1", a determination is made as to whether transferring is finished or not in the step S511. If unfinished, the program returns at once, otherwise, the program switches the switch 116 to the copy mode in the step S512, proceeds to the step S513, setting the dot size switching signal to "0", carries out printing in the step S514, and updates the internal state in the step S515.

When the internal state is 2, the program proceeds to the step S521, and a determination is made as to whether unfinished or not. If printing is not finished, the program returns at once, otherwise, the program sets the internal state and the control mode to "0" in the steps S522, S523 respectively, and then returns.

Figures 12, 13:
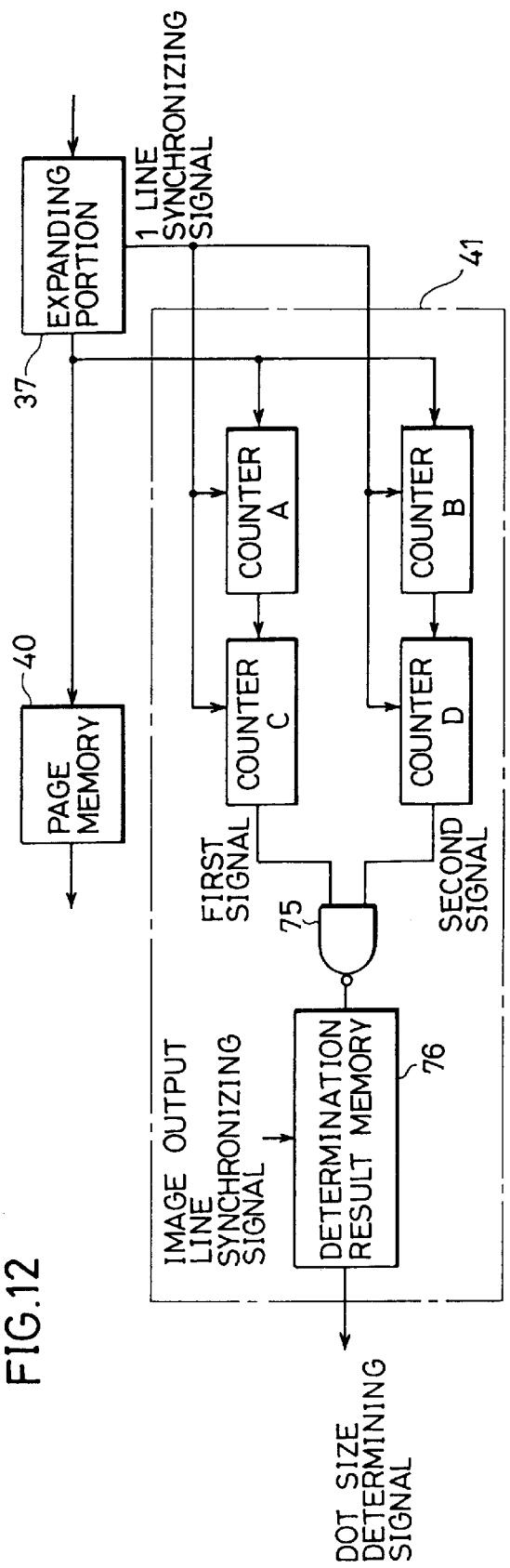
FIGS. 12 and 13 are diagrams showing an image mode detecting portion and output signals thereof.

A description will now be made of a method of determining an image mode, referring to FIG. 12. FIG. 12 is a block diagram showing the details of the image mode detecting portion 41. Referring to FIG. 12, the image mode detecting portion 41 is connected to the expanding portion 37 and includes: counters A to D for carrying out counting-up in response to a synchronizing signal with every line; a NAND gate 75, responsive to the signals from the counters C and D, outputs a signal for determining the kind of the image data; and a determination result memory 76 for recording a determination result based on the kind of the image data. The counter A counts the number of continuous black pixels in response to the synchronizing signal of every line. When a white pixel is supplied as input, however, it is cleared. It is also cleared by a 1 line synchronizing signal. When the number of black pixels attains a predetermined value or above, it generates a black pixel continuous signal.

The counter B operates in the same manner as that of the counter A with respect to white pixels.

The counter C is connected to the counter A and counts black pixel continuous signals which the counter A supplies. The counter C is also cleared by a 1 line synchronizing signal. When the count value attains a predetermined value or above, it supplies a first signal.

The counter D supplies a second signal in the same manner as counter C.

A dot size determining signal, which will be described later in FIG. 13, is supplied from the NAND gate 75 in accordance with the kind of the image data and based on the first signal and the second signal from counter C and counter D.

The determination result memory 76 records the value indicating whether the image is a half tone image or a text image for every line, based on the output signal from the NAND gate 75. At the time of outputting the image, a dot size determining signal is supplied for the line being presently recorded by an image output line synchronizing signal.

In the method of detecting the image mode shown in FIG. 12, a distinction is made between a half tone image and a text image according to the following characteristics.

In a half tone image, black and white pixels do not tend to continue. Generally, when a half tone process is carried out with a dither method, a matrix size of at most 8×8 is employed. Therefore, if the reproduced image has a high density, there is a very low probability that white pixels continue, as well, if the reproduced image has a low density, there is a very low probability that black pixels continue.

In a text image, black and white pixels tend to continue. In the case of character pixels, as long as white and black are not the other way around, there is a very high probability that white continues long. Even in the case of characters, if the image signal is supplied with 8 lines/mm, black pixels continue for about 4 pixels (0.5 mm) even in a longitudinal line and they further continue in the case of a lateral line.

The counters C and D generate a signal "1" when the probability that the pixels of black or white continue is high. There are shown the values of the output signals from the counter C and the counter D, determinations of the kind of the image data by the output signal from the NAND gate 75 at that time, and the values of the dot size determining signal in FIG. 13.

In the embodiment above, the method of the image mode detecting portion 41 in determining the kind of image data is founded on the probability that the black pixels and the white pixels continue.

(1) An image mode is determined depending on whether the probability is high or low that the white pixels continue for a predetermined value or more. This is a method in which a determination is made employing only one of the embodiments shown in FIG. 12. While the cost for this embodiment is low, the accuracy of the determining result is also low.

(2) An image mode is determined depending on whether the probability is high or low that the black pixels continue for a predetermined value or more. This has the same characteristic as (1) above.

(3) A determination shown in (1), (2) or FIG. 12 above is made with respect to a block of two dimensions.

(4) A determination may be made not with every line but with every page.

Figure 14:
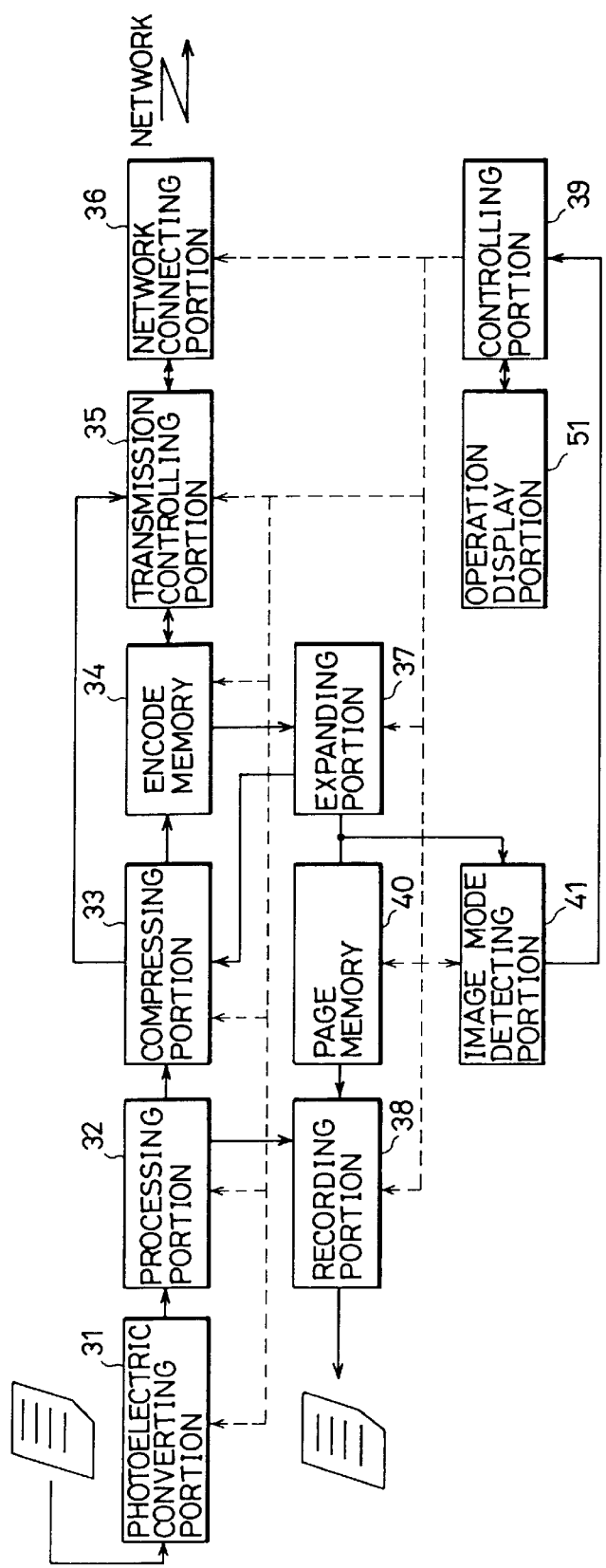
Figure 15:
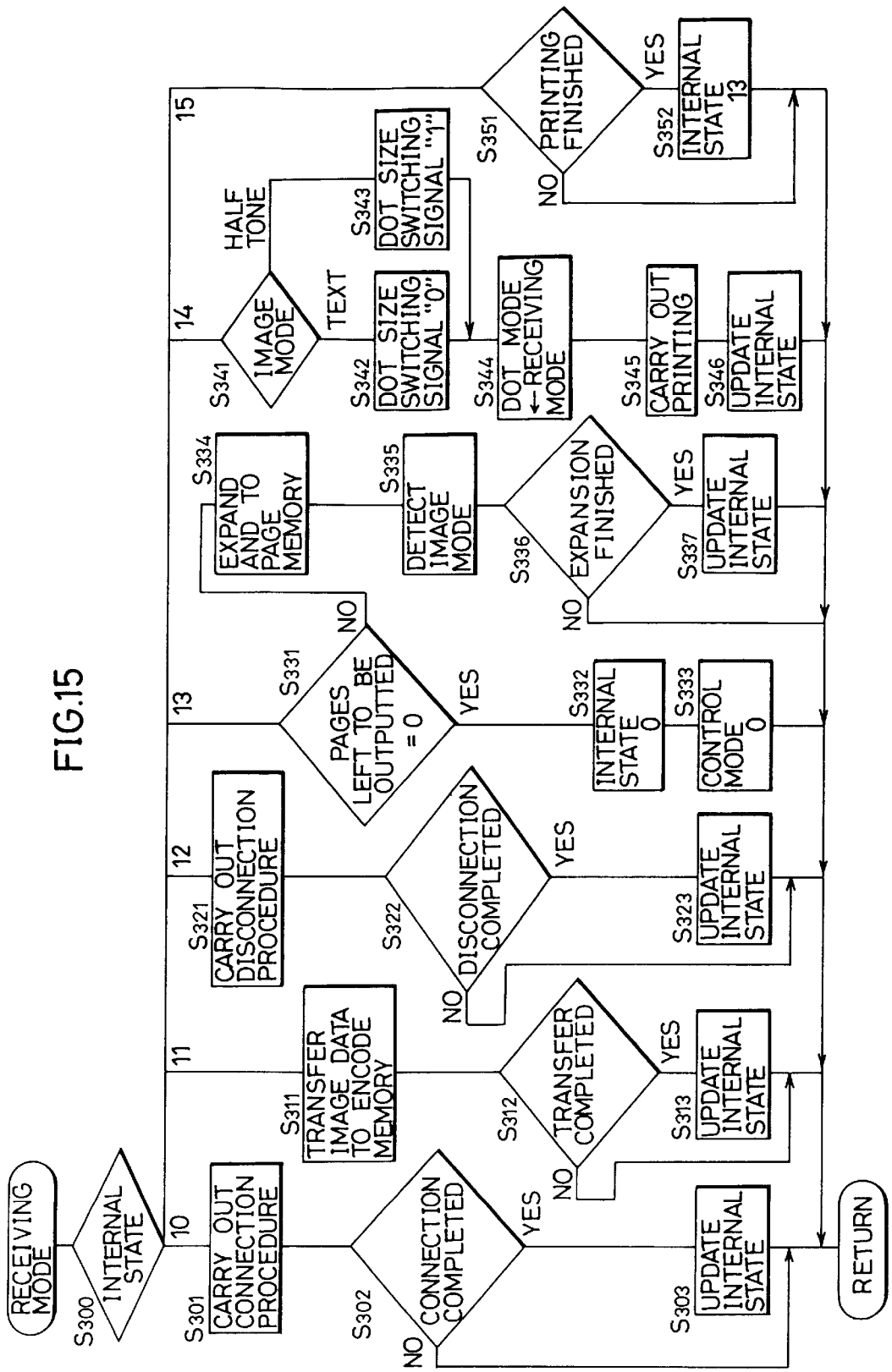

Diagrams corresponding to FIGS. 2 and 9 of the embodiment above are shown as another embodiment in FIGS. 14 and 15. Referring to FIG. 14, the image mode detecting portion 41 determines the kind of image data (i.e., half tone image or a text image) in accordance with every page. The determination result thereof is supplied to the CPU 71 included in controlling portion 39. The CPU 71 supplies a dot size switching signal to the recording portion 38 based on the result of the determination above. In this case, as an image mode is detected with every page, a signal is supplied to the controlling portion 39 after the image mode is detected with every page so that the image is recorded. Since the portions other than that are the same as those in the embodiment shown in FIG. 2, the same portions are given the same reference numerals and a description thereof will not be repeated here.

FIG. 15 is a flow chart in a case in which an image mode is determined with every page. It is different from FIG. 9 in a portion where the internal state is 13 and 14. The content of the encode memory 34 is expanded and transferred to the page memory 40 in the step S334. An image mode is detected by the image mode detecting method stated above (step S335), and a determination is made as to whether the expansion of the image data is finished for one page in the step S336. If unfinished, the program returns at once, otherwise, the program updates the internal state in the step S337 and then returns.

When the internal state is 14, the program proceeds to the step S341, determines if the expanded image is a text image or a half tone image, supplies a dot size switching signal (steps S342, S343) according to such determination, sets the switch to the receiving mode (step S344), gives the recording portion 38 an activation command and carries out printing (step S345). The program then updates the internal state in the step S346 and then returns. As the content of the portions other than that stated above is the same as that described in FIG. 9, a description thereof will not be repeated here.

In the embodiments above, an image mode is detected on a line basis or on a page basis. Besides that, a determination of an image may be made on a pixel basis. An embodiment in that case will now be described with a reference to FIGS. 16 and 17. In this embodiment, a determination of an image is made with a pattern of an image matrix of 3×3, and a determination result is obtained as to whether the result is a half tone or a binary with respect to the center pixel of the matrix. Example of the patterns in this case are shown in FIG. 17. The patterns are set according to the fact that the pixels are dispersed moderately in the case of the half tone and the pixels continue in the case of characters.

Figure 16:
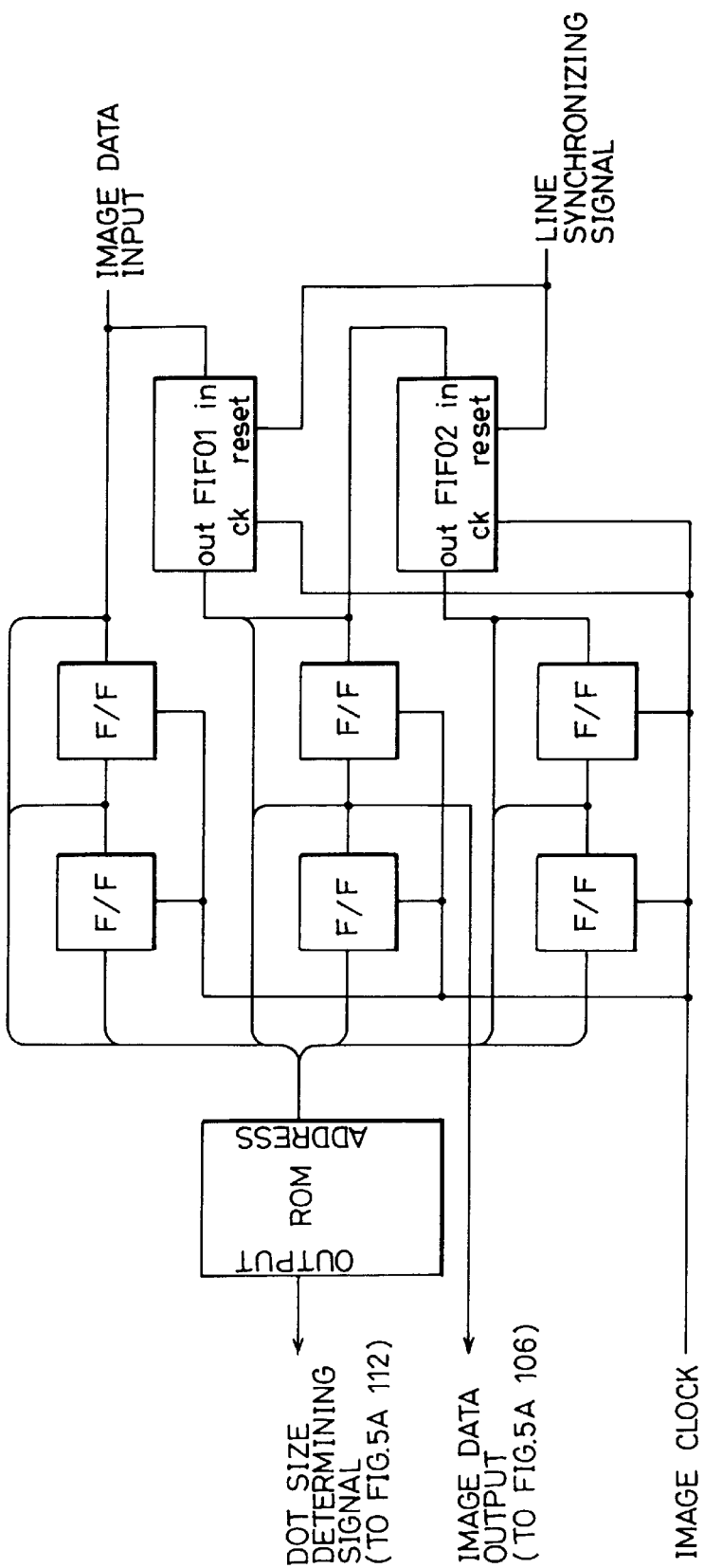

FIG. 16 is a block diagram showing the determining circuit. Referring to FIG. 16, the image data supplied to the recording portion is applied to a FIFO1, as well as to a F/F (flipflop), delayed for one pixel by an image clock, then applied to a subsequent F/F, and further delayed for one pixel, so that the image data of three pixels is supplied to an address of the ROM in the main scanning direction. The image data supplied to the FIFO1 is applied to ROM in accordance with the image clock and data stored previously (data one line before a line synchronizing signal is inputted) is outputted, so that data which is delayed for one line in the feed direction is supplied. The output is supplied to FIFO2 and passes via the F/F in the same way as above. As a result, the data of three pixels is outputted.

The FIFO1 is reset by the line synchronizing signal, the image is input to the FIFO1 and the FIFO1 supplies previous data at the same time. Image data of the main scanning 3 pixels×the 3 feed lines as a whole is supplied by further passing the data through the FIFO2 of one more stage. This data of 9 pixels is supplied to the ROM, and a determining signal is supplied with a dot size according to the pattern. An example of patterns stored in the ROM is shown in FIG. 17. It is determined that the pixels in the pattern as shown in (1) of FIG. 17 are half tone while they are of a text image in a case such as (2), and then a signal is supplied.

As stated above, a determination is made as to whether the pixel in the center is a binary or a half tone from the 9 pixels of 3×3 matrix, and a dot size determining signal is supplied on a pixel basis.

II. Second Embodiment The size of recording dots is changed according to the image mode in the first embodiment. In the second embodiment, the density of the recording dots is changed instead of changing the size of the recording dots.

Figure 18:
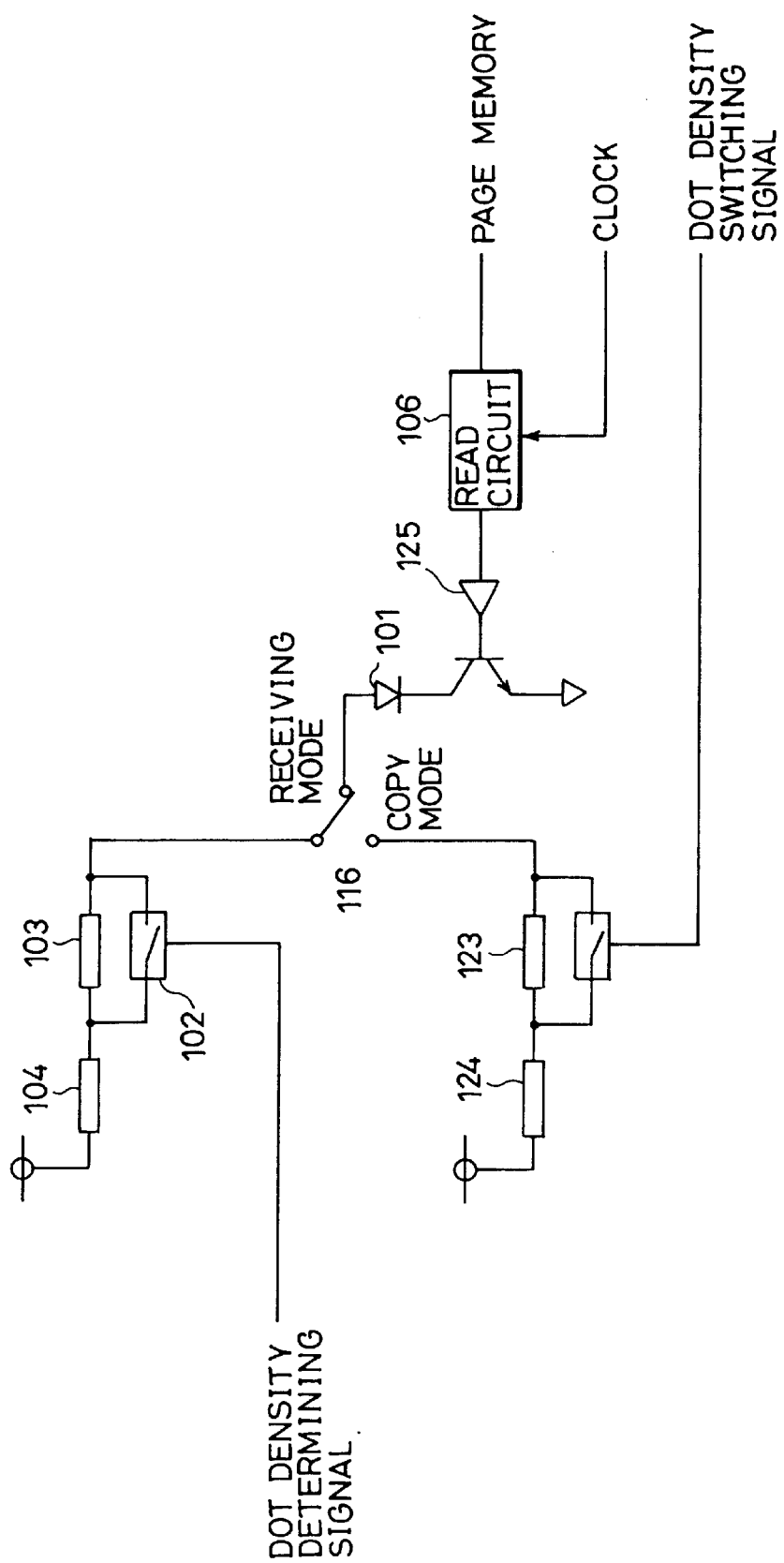
FIG. 18 is a diagram for explaining the operation of a facsimile device according to a second embodiment of the present invention.

FIG. 18 corresponds to FIG. 5A of the first embodiment and is a block diagram of a circuit in which the density of the recording dots is switched by controlling the power of a semiconductor laser. Data to be recorded is read from the page memory 40 by a read circuit 106 in synchronization with a clock and supplied to a driver 125. For the receiving mode, the power of the semiconductor laser 101 is limited by resistors 103, 104. At this time, if a switch 102 is turned on by a dot density determining signal supplied from the image mode detecting portion 41, the power is limited by the resistor 104 only, and if it is turned off, the power is limited by the resistors 103 and 104. When the power of the semiconductor laser changes, the potential on a photoreceptor drum is changed and the density of the dots when developed in a developing unit is changed.

The dot density determining signal is the same signal as the dot size determining signal supplied from the image mode detecting portion 41 shown in FIG. 12. At the time of the copy mode, the power of the semiconductor laser 101 is controlled by limiting supplied voltage by resistors 123 and 124.

In the second embodiment, the density of the recording dots is switched by controlling the power of the semiconductor laser 101. Besides this, the density of the dots may be switched, for example, by switching a bias voltage at the time of development.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A facsimile device comprising:

receiving means for receiving image data through a communication network;

image forming means for forming an image with a plurality of unit pixels based on said image data;

determining means for determining whether said image data is image data of a character image or image data of a half tone image; and control means for controlling a physical property of all of the plurality of unit pixels with which said image forming means forms the image based on the result of determination of said determining means.

2. The facsimile device according to claim 1, wherein said control means controls the size of the unit pixels with which said image forming means forms the image.

3. The facsimile device according to claim 2, wherein said control means controls said image forming means so that the size of said unit pixels is made larger when said determining means determines that said image data is image data of a character image than when it determines that said image data is image data of a half tone image.

4. The facsimile device according to claim 3, wherein said image forming means determines the size of the unit pixels based on a pulse of a predetermined length generated at fixed intervals and wherein said control means controls the condition of forming the image by changing the length of said pulse.

5. The facsimile device according to claim 1, wherein said control means controls the density of the unit pixels with which said image forming means forms the image.

6. The facsimile device according to claim 5, wherein said controls means controls said image forming means so that the density of said unit pixels is made higher when said determining means determines that said image data is image data of a character image than when it determines that said image data is image data of a half tone image.

7. The facsimile device according to claim 1, wherein said determining means determines that said image data is image data of a character image when a predetermined number of data of the same color is continuously detected in said image data.

8. The facsimile device according to claim 7, wherein said determining means makes a determination for said image data with every page.

9. The facsimile device according to claim 7, wherein said determining means makes a determination for said image data with every line.

10. A facsimile device comprising:

receiving means for receiving image data through a communication network;

reading means for reading an original image and creating image data;

image forming means for forming an image with a plurality of unit pixels based on image data from said receiving means or image data from said reading means;

determining means for determining whether the image data used for forming the image of said image forming means is image data from the receiving means or image data from the reading means; and control means for controlling a physical property of all of the plurality of unit pixels with which said image forming means forms the image based on the result of determination of said determining means.

11. The facsimile device according to claim 10, wherein said control means controls the size of the unit pixels with which said image forming means forms said image.

12. The facsimile device according to claim 11, wherein said control means controls the density of the unit pixels with which said image forming means forms said image.

13. The facsimile device according to claim 11, further comprising determining means for determining the kind of the image data which said receiving means received, wherein said control means further controls the condition of the unit pixels with which said image forming means forms the image based on the result of determination of said determining means.

14. A facsimile device comprising:

receiving means for receiving image data through a communication network;

image forming means for forming an image with a plurality of unit pixels based on said image data;

determining means for determining whether said image data is image data of a character image or image data of a half tone image by sensing a number of continuous pixels of the image data having a same pigmentation; and control means for controlling a physical property of all of the plurality of unit pixels with which said image forming means forms the image based on the result of determination of said determining means.

15. A facsimile device comprising:

receiving means for receiving image data through a communication network;

image forming means for forming an image with a plurality of unit pixels based on said image data;

determining means for determining whether at least each line of said image data is image data of a character image or image data of a half tone image; and control means for controlling a physical property of all of the plurality of unit pixels with which said image forming means forms at least each line of the image based on the result of determination of said determining means.

* * * * *